US008250499B2

United States Patent
Chen et al.

(10) Patent No.: US 8,250,499 B2
(45) Date of Patent: *Aug. 21, 2012

(54) INTEGRATED CIRCUIT WITH ON-BOARD POWER UTILIZATION INFORMATION

(75) Inventors: Chun-ying Chen, Irvine, CA (US); Pieter Vorenkamp, Laguna Niguel, CA (US); Neil Y. Kim, Laguna Niguel, CA (US); Sumant Ranganathan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/084,107

(22) Filed: Apr. 11, 2011

(65) Prior Publication Data

US 2011/0191736 A1 Aug. 4, 2011

Related U.S. Application Data

(63) Continuation of application No. 11/166,830, filed on Jun. 24, 2005, now Pat. No. 7,926,008.

(60) Provisional application No. 60/583,312, filed on Jun. 28, 2004.

(51) Int. Cl.
*G06F 17/50* (2006.01)

(52) U.S. Cl. ........ 716/100; 716/106; 716/109; 716/115; 716/127; 716/133; 716/136; 716/138

(58) Field of Classification Search .................. 716/100, 716/106, 109, 115, 127, 133, 136, 138
See application file for complete search history.

(56) References Cited

U.S. PATENT DOCUMENTS

| 5,444,664 A | 8/1995 | Kuroda et al. |
| 6,459,175 B1 | 10/2002 | Potega |
| 6,856,556 B1 | 2/2005 | Hajeck |
| 7,926,008 B2 | 4/2011 | Chen et al. |
| 2004/0196678 A1 | 10/2004 | Yoshimura et al. |
| 2004/0268278 A1* | 12/2004 | Hoberman et al. ............... 716/5 |
| 2005/0188230 A1 | 8/2005 | Bilak |
| 2005/0285639 A1 | 12/2005 | Chen et al. |
| 2006/0284655 A1 | 12/2006 | Li et al. |

* cited by examiner

*Primary Examiner* — Paul Dinh

(74) *Attorney, Agent, or Firm* — Brinks Hofer Gilson & Lione

(57) ABSTRACT

A system and method for storing power utilization information in an integrated circuit and utilizing such information. Various aspects of the present invention provide an integrated circuit that comprises a first module, which stores power utilization information for at least a portion of the integrated circuit. A second module of the integrated circuit may communicate the power utilization information with an electrical device external to the integrated circuit. Various aspects of the present invention provide a method for storing power utilization information in an integrated circuit. For example, a performance characteristic and/or a power supply characteristic may be monitored as the integrated circuit is utilized. Power utilization information may be determined from the monitored characteristic(s), and the power utilization information may be stored in the integrated circuit. Various aspects of the present invention also provide a system and method for utilizing an integrated circuit having on-board power utilization information.

20 Claims, 4 Drawing Sheets

INTEGRATED CIRCUIT WITH ON-BOARD POWER UTILIZATION INFORMATION

CROSS-REFERENCE TO RELATED APPLICATIONS/INCORPORATION BY REFERENCE

This patent application is a continuation of U.S. patent application Ser. No. 11/166,830, filed Jun. 24, 2005, and issuing on Apr. 12, 2011 as U.S. Pat. No. 7,926,008; which makes reference to, claims priority to and claims benefit from U.S. provisional patent application Ser. No. 60/583,312, filed Jun. 28, 2004, and entitled "INTEGRATED CIRCUIT WITH ON-BOARD POWER UTILIZATION INFORMATION," the contents of each of which are hereby incorporated herein by reference in their entirety.

FEDERALLY SPONSORED RESEARCH OR DEVELOPMENT

Not applicable

SEQUENCE LISTING

Not applicable

MICROFICHE/COPYRIGHT REFERENCE

Not applicable

BACKGROUND OF THE INVENTION

Electronic circuits may have a variety of respective power input requirements. Such requirements may, for example, include requirements as to power supply level and/or power supply quality. This may even be the case, for example, when the electronic circuits are generally designed to operate in a similar power input range. For example, for optimal performance, a first circuit may require first electrical power that is characterized by a first set of power characteristics (e.g., a first voltage level), and a second circuit may require second electrical power that is characterized by a second set of power characteristics (e.g., a second voltage level) that is different than the first set of power characteristics. In an exemplary scenario where the first and second circuits are generally designed to operate in a common voltage range, the first and second sets of power characteristics (e.g., first and second voltage levels) may still be substantially different. Additionally, desired input power characteristics for an electrical circuit may change over time (e.g., during circuit operation).

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for storing power utilization information for an integrated circuit, or portion thereof, in an integrated circuit and utilizing such power utilization information, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
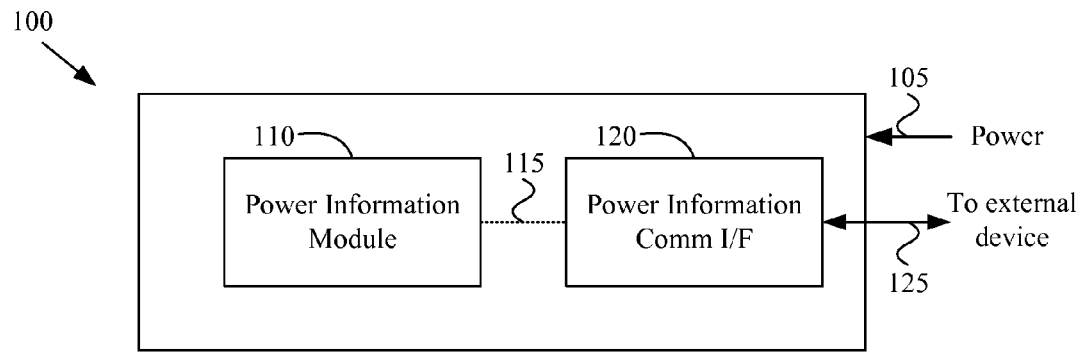
FIG. 1 illustrates an exemplary integrated circuit comprising on-board power utilization information, in accordance with various aspects of the present invention.

FIG. 1 illustrates an exemplary integrated circuit 100 comprising on-board power utilization information, in accordance with various aspects of the present invention. The integrated circuit 100 may comprise any of a large variety of integrated circuit characteristics. For example and without limitation, the integrated circuit 100 may comprise a microprocessor, memory, signal processor, communication circuit, user interface circuit, sensor circuitry, etc. Accordingly, the scope of various aspects of the present invention should not be limited by characteristics of a particular type of circuit or integrated circuit.

The exemplary integrated circuit 100 may comprise a power information module 110. The power information module 110 may, for example, store power utilization information for the integrated circuit and/or a module of the integrated circuit.

The power utilization information may comprise any of a variety of characteristics. For example and without limitation, the power utilization information may comprise information related to electrical power received by the integrated circuit and/or a portion thereof.

The power utilization information may comprise information related to various aspects of electrical power. For example and without limitation, the power utilization information may comprise information of voltage and current level. The power utilization information may, for example, comprise information of voltage and/or current variability, such as, for example, tolerance range, ripple, or other fluctuation information. Also for example, the power utilization information may comprise information of noise level and power supply load response characteristics. The power utilization information may also, for example, comprise information regarding power and/or energy consumed by at least a portion of the integrated circuit and/or other circuitry.

The power utilization information may comprise information of preferable power supply characteristics for the integrated circuit and/or a portion thereof. For example, the power utilization information may also comprise information of preferable power supply characteristics for electrical circuitry other than the integrated circuit. In a non-limiting exemplary scenario, a plurality of integrated circuits may perform individual tasks in support of an aggregate task. In such a non-limiting exemplary scenario, the power utilization information may comprise information of power supply characteristics for one or more of the plurality of integrated circuits.

The power utilization information may comprise information of preferable (e.g., optimal or near-optimal) power supply characteristics for the integrated circuit or a portion thereof. For example, the power utilization information may comprise information of power supply characteristics that are preferred for the operation of the integrated circuit. Such power supply characteristics may be preferred for any of a variety of reasons, including but not limited to, functional performance level, longevity, noise reduction, energy efficiency, etc. Accordingly, the scope of various aspects of the present invention should not be limited by any particular rationale for preferring one set of power supply characteristics to another.

The power utilization information may, for example, comprise information of a recommended range of power supply characteristics provided to the integrated circuit and/or a portion thereof. In an exemplary scenario, the power utilization information may comprise information of a voltage range over which a manufacturer recommends that the integrated circuit be operated.

The power utilization information may, for example, comprise information of estimated or actual preferred power supply characteristics for the integrated circuit or a portion thereof. For example and without limitation, power utilization information may be determined for an integrated circuit by direct test of the integrated circuit, test of a proxy integrated circuit representative of a manufacturing batch, computer simulation, theoretical analysis, test of an aggregate circuit of which the integrated circuit is a part, etc. Accordingly, the scope of various aspects of the present invention should not be limited by characteristics of a particular manner in which the power utilization information may be determined.

The power utilization information may, for example, comprise information of circuit performance correlated to power supply characteristics. For example and without limitation, the power utilization information may comprise one or more power supply characteristics correlated to optimal processing performance, one or more power supply characteristics correlated to optimal energy efficiency, one or more power supply characteristics correlated to a compromise between processing performance and energy-efficiency, etc.

The power utilization information may, for example, be based at least in part on power supply characteristics that are monitored during utilization of the integrated circuit, a portion thereof, or an aggregate circuit of which the integrated circuit is a part. Also for example, the power utilization information may be further based, at least in part, on performance characteristics that are monitored during use of the integrated circuit, a portion thereof, or an aggregate circuit of which the integrated circuit is a part.

Such monitoring of power supply characteristics and/or performance characteristics may, for example, occur during utilization of the integrated circuit in a test environment (e.g., at an integrated circuit or other product manufacturing facility). In an exemplary scenario, an integrated circuit test station at a manufacturing facility may test the integrated circuit at a variety of power supply characteristics to determine the power supply characteristics at which the integrated circuit operates best or at which the integrated circuit meets performance requirements.

Such monitoring may also, for example, occur during commercial utilization of the integrated circuit (e.g., as the integrated circuit is utilized for its intended purpose in a consumer product). In an exemplary scenario, a commercial product incorporating the integrated circuit may comprise monitoring components that monitoring power supply characteristics and/or performance of the integrated circuit during typical consumer use of a commercial product incorporating the integrated circuit.

In general, power supply and/or performance characteristics for the integrated circuit may be monitored in any of variety of manners. Accordingly, the scope of various aspects of the present invention should not be limited by a particular manner in which various power supply characteristics or performance characteristics may be monitored during use of the integrated circuit.

The power information module 110 may comprise any of a variety of information storage circuit characteristics. For example, the power information module 110 may comprise hardware components, software components or a combination thereof. The power information module 110 may, for example, comprise circuitry for hard-wired power utilization information. The power information module 110 may, for example, comprise a read-only or one-time-writable memory. The power information module 110 may, for example, comprise a re-writable memory. Such memory may, for example, be non-volatile, but may also be volatile in particular circuit scenarios. The power information module 110 may, for example, comprise circuitry for communicating or assisting to communicate the power utilization information with other devices. In general, the power information module 110 may comprise any of a variety of information storage circuit characteristics. Accordingly, the scope of various aspects of the present invention should not be limited by characteristics of particular hardware and/or software implementations of an information storage module.

The exemplary integrated circuit 100 may comprise a power information communication interface module 120. The communication interface module 120 may be communicatively coupled to the power information module 110 (e.g., with an internal data bus 115). Alternatively, for example, the communication interface module 120 may be communicatively coupled to the power information module 110 through shared memory access. In general, the communication interface module 120 may be communicatively coupled to the power information module 110 in any of a variety of known manners.

The power information communication interface module 120 may, for example, communicate power utilization information (e.g., as stored in the power information module 110) to various electrical devices. For example and without limitation, such an electrical device may comprise an electrical device external to the integrated circuit 100. Such an electrical device may, for example, comprise power supply circuitry that receives power utilization information from the communication interface module 120 and utilizes such power utilization information to control power supply characteristics. Such power supply circuitry may, for example and without limitation, provide the electrical power 105, or a portion thereof, to the integrated circuit 100.

Such an electrical device may alternatively, for example, comprise integrated circuit and/or product test circuitry, which may determine power utilization information and communicate such power utilization information to the communication interface module 120 for ultimate storage in the power information module 110. Such an electrical device may, for example, comprise consumer product circuitry (e.g., consumer product circuitry that utilizes the integrated circuit). Accordingly, the scope of various aspects of the present invention should not be limited by characteristics of a particular electrical device with which the communication interface module 120 may communicate power utilization information.

The communication interface module 120 may communicate with such an external device utilizing a data bus 125. Such a data bus 125 may, for example and without limitation, comprise a data bus dedicated to power utilization information. Such a data bus 125 may alternatively, for example, comprise a general data bus, which may be utilized to communicate power utilization information. Such a data bus 125 may further, for example, comprise a data communication channel that physically resides on a power supply line.

In general, the power information communication interface module 120 may communicate the power utilization information with an electrical device (e.g., external to the integrated circuit 100). Accordingly, the scope of various aspects of the present invention should not be limited by characteristics of particular communication interface circuitry, which may comprise hardware, software or a combination thereof.

Figure 2:
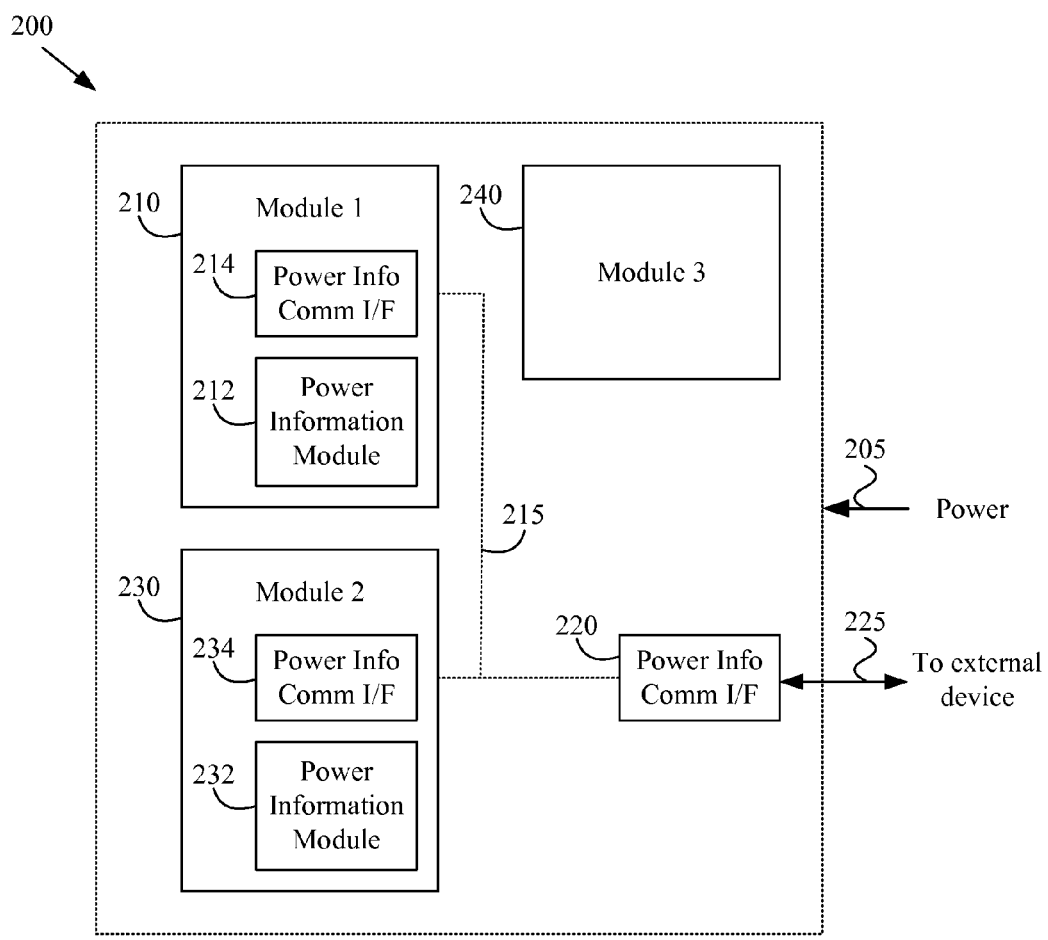
FIG. 2 illustrates an exemplary integrated circuit comprising modules having respective on-module power utilization information, in accordance with various aspects of the present invention.

FIG. 2 illustrates an exemplary integrated circuit 200 comprising modules having respective on-module power utilization information, in accordance with various aspects of the present invention. The integrated circuit 200 may, for example and without limitation, share various characteristics with the exemplary integrated circuit 100 illustrated in FIG. 1 and discussed previously. For example, the integrated circuit 200 may comprise any of a large variety of integrated circuit characteristics.

The exemplary integrated circuit 200 may comprise a first functional module 210. The first functional module 210 may generally comprise a hardware and/or software module that performs a beneficial function. Such a function may, for example and without limitation, comprise microprocessor functionality, signal processing, user interfacing, communication interfacing, etc. The integrated circuit 200 may, for example, comprise only the first functional module 210 or may comprise additional functional modules. A functional module may, for example, be distinct from or partially integrated with another functional module. In other words, there need not always be a distinction between particular portions of two functional modules.

In an exemplary scenario, two different functional modules may be completely physically distinct from each other. In another exemplary scenario, two functional modules may comprise software differences but share the same hardware. In yet another exemplary scenario, two functional modules may share a portion of hardware and/or software (e.g., utilizing the same processor, I/O circuitry, software, etc.). In general, a functional module comprises a circuit, which might comprise hardware and/or software aspects, that performs a beneficial function in an integrated circuit. Accordingly, the scope of various aspects of the present invention should not be limited by characteristics of a particular functional module or by characteristics of a particular relationship between functional modules.

The exemplary first functional module 210 may comprise a power information sub-module 212 that stores power utilization information for the first functional module 210 or a portion thereof. The power information sub-module 212 may, for example and without limitation, share various characteristics with the power information module 110 of the exemplary integrated circuit 100 illustrated in FIG. 1 and discussed previously.

The exemplary first functional module 210 may comprise a power information communication interface sub-module 214 that communicates the power utilization information for the first functional module 210 to a module external to the first functional module 210. The communication interface sub-module 214 may, for example and without limitation, share various characteristics with the power information communication interface module 120 of the exemplary integrated circuit 100 illustrated in FIG. 1 and discussed previously.

For example, the communication interface sub-module 214 may communicate the power utilization information directly to another module that is internal to the integrated circuit 200 or external to the integrated circuit 200.

The exemplary integrated circuit 200 comprises a power information communication interface module 220 for the integrated circuit 200. The communication interface module 220 may share various aspects with the communication interface module 120 of the exemplary integrated circuit 100 illustrated in FIG. 1 and discussed previously.

The communication interface sub-module 214 of the first functional module 210 may be communicatively coupled (e.g., through an internal data bus 215) to the communication interface module 220 for the integrated circuit 200. In such an exemplary configuration, the communication interface module 220 may serve as a communication interface between the first functional module 210 and devices external to the integrated circuit 200.

The power information communication interface module 220 may, for example, communicate power utilization information (e.g., as stored in the power information sub-module 212) to various electrical devices. For example and without limitation, such an electrical device may comprise an electrical device external to the integrated circuit 200. Such an electrical device may, for example, comprise power supply circuitry that receives power utilization information from the communication interface module 220 and utilizes such power utilization information to control power supply characteristics. Such power supply circuitry may, for example and without limitation, provide the electrical power 205, or a portion thereof, to the integrated circuit 200.

The exemplary communication interface module 220 may also, for example, communicate power utilization information with other modules within the integrated circuit 200. For example, in an exemplary scenario, the communication interface module 220 may communicate power utilization information of the first functional module 210 with the third functional module 240. The exemplary third functional module 240 may comprise any of a large variety of the circuit characteristics discussed previously. The third functional module 240 may, for example and without limitation, comprise characteristics of processor circuitry, user interface circuitry, communication circuitry, power regulation circuitry, etc.

As mentioned previously, the exemplary integrated circuit 200 may comprise functional modules in addition to the first functional module 210. The exemplary integrated circuit 200 illustrated in FIG. 2 comprises a second functional module 220. The second functional module 220 may share various characteristics with the first functional module 210. As mentioned previously, the first and second functional modules 210, 220 may be completely distinct or may share various hardware and/or software components. In fact, in some scenarios, the first and second functional modules 210, 220 may perform a same beneficial function, while utilizing at least a portion of different hardware and/or software.

The second functional module 230 may, similar to the first functional module 210, comprise a power information sub-module 232 that stores power utilization information for the second functional module 230. The power information sub-module 232 may, for example and without limitation, share various characteristics with the power information sub-module 212 of the first functional module 210 discussed previously.

The exemplary second functional module 230 may comprise a power information communication interface sub-module 234 that communicates the power utilization information for the second functional module 230 to a module external to the second functional module 230. The communication interface sub-module 234 may, for example and without limitation, share various characteristics with the communication interface sub-module 214 of the first functional module 210 discussed previously.

For example, the communication interface sub-module 234 may communicate the power utilization information directly to another module that is internal to the integrated circuit 200 or external to the integrated circuit 200. The communication interface sub-module 234 of the second functional module 230 may, for example, be communicatively coupled (e.g., through an internal data bus 215 or a different bus) to the communication interface module 220 for the integrated circuit 200. In such an exemplary configuration, the communication interface module 220 may serve as a communication interface between the second functional module 230 and devices external to the integrated circuit 200.

Figure 3:
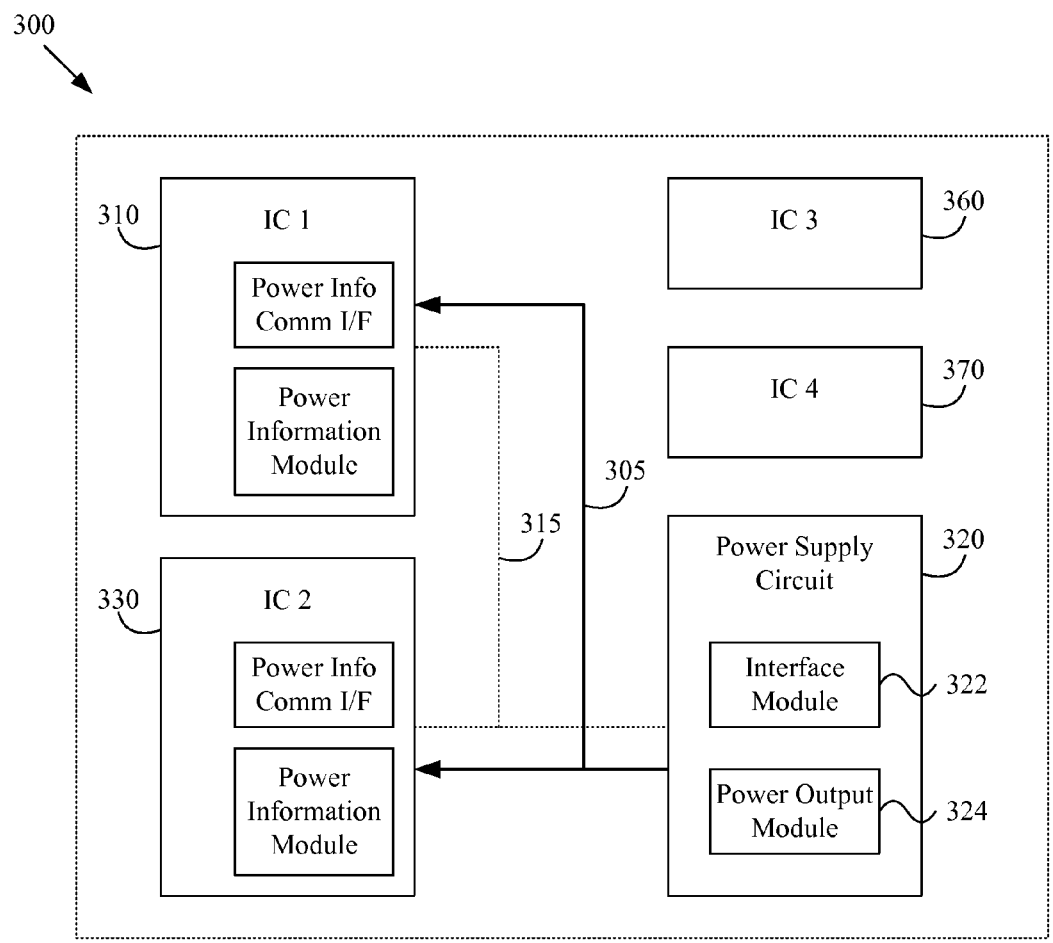
FIG. 3 illustrates an exemplary electrical system utilizing on-board power utilization information, in accordance with various aspects of the present invention.

FIG. 3 illustrates an exemplary electrical system 300 utilizing on-board power utilization information, in accordance with various aspects of the present invention. The exemplary electrical system 300 may comprise characteristics of any of a large variety of electrical systems. For example and without limitation, the electrical system 300 may comprise characteristics of an audio/video/data processing system, a communication system, a computing system, a control system, a user interface system, etc. Accordingly, the scope of various aspects of the present invention should not be limited by characteristics of any particular electrical system 300.

The exemplary electrical system 300 may comprise a first integrated circuit 310. The first integrated circuit 310 may, for example and without limitation, share various characteristics with the exemplary integrated circuit 100 illustrated in FIG. 1 and discussed previously. For example, the first integrated circuit 310 may comprise a power information module that stores power utilization information for at least a portion of the first integrated circuit 310. The first integrated circuit 310 may also comprise a power information communication interface module that communicates the power utilization information for the first integrated circuit 310 to an electrical device external to the integrated circuit.

In the exemplary system 300 illustrated in FIG. 3, the first integrated circuit 310 (e.g., the power information communication interface module) is communicatively coupled with a power supply circuit 320 through a power information data bus 315. The power information data bus 315 may, for example, comprise any of a variety of data bus characteristics. The power information data bus 315 may comprise a general-purpose data bus, a portion of the power supply bus, a bus dedicated to power information, etc. Accordingly, the scope of various aspects of the present invention should not be limited by characteristics of a particular data bus.

The power supply circuit 320 may comprise an interface module 322 that communicates power utilization information (e.g., as communicated over the power information data bus 315). The interface module 322 of the power supply circuit 320 may, for example, be communicatively coupled to the power information communication interface module of the first integrated circuit 310.

The power supply circuit 320 may comprise a power output module 324 that provides electrical power to the first integrated circuit 310 over the power supply bus 305. Characteristics of the electrical power may, for example, be based at least in part on power utilization information communicated with the interface module 322 by the first integrated circuit 310. Such electrical power may comprise a single power signal or a plurality of power signals (e.g., at respective voltage levels or other power supply characteristics).

In an exemplary scenario, power utilization information communicated between the first integrated circuit 310 and the power supply circuit 320 may comprise information of a preferred operating voltage for the first integrated circuit 310. The power output module 324 of the power supply circuit 320 may provide electrical power to the first integrated circuit 310 over the power supply bus 305, where the electrical power is characterized by the preferred operating voltage.

Note that the power supply circuit 320 may communicate power utilization information with the first integrated circuit 310 in either direction (i.e., sending or receiving). In a non-limiting exemplary scenario, the power supply circuit 320 may communicate power utilization information to the first integrated circuit 310 for storage in the power information module of the first integrated circuit 310. Accordingly, the scope of various aspects of the present invention should not be limited by directional characteristics of power utilization information flow.

The exemplary system 300 may also comprise a second integrated circuit 330. The second integrated circuit 330 may, for example and without limitation, share various characteristics with the first integrated circuit 310 discussed previously. For example, the second integrated circuit 330 may comprise a power information module that stores second power utilization information for at least a portion of the second integrated circuit 330. The second integrated circuit 330 may also, for example, comprise a power information communication interface module that communicates the second power utilization information (e.g., with the interface module 322 of the power supply circuit 320.

The power output module 324 may provide electrical power to the second integrated circuit 330 over the power supply bus 305. In the exemplary system 300 illustrated in FIG. 3, the first integrated circuit 310 and the second integrated circuit 330 receive electrical power over the same power supply bus 305. In an alternative scenario, the first and second integrated circuits 310, 330 may receive electrical power over separate power supply buses.

The characteristics of the electrical power may, for example, be based at least in part on power utilization information communicated with the interface module 322 of the power supply circuit 320 by the second integrated circuit 330. In an exemplary scenario, the characteristics of the electrical power may, for example, be based on power utilization information communicated with both the first integrated circuit 310 and the second integrated circuit 330. In such an exemplary scenario, the power supply circuit 320 may process (e.g., arbitrate) power utilization information from a plurality of integrated circuits to determine characteristics of provided electrical power.

The exemplary system 300 may also, for example, comprise a third integrated circuit 360 and a fourth integrated circuit 370. The third and fourth integrated circuits 360, 370 may, for example and without limitation, share various characteristics with the first integrated circuit 310. Alternatively, the third and fourth integrated circuits 360, 370 might not comprise the power information storage and communication capabilities of the first and second integrated circuits 310, 330.

Figure 4:
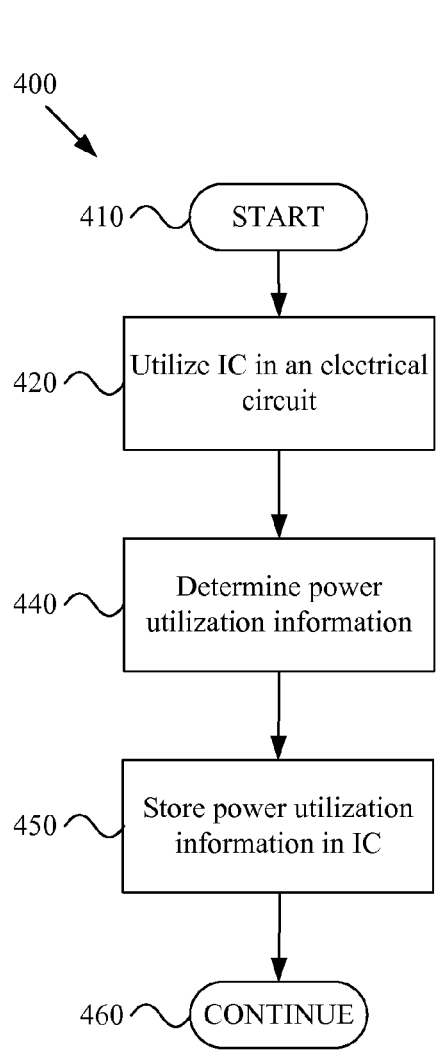
FIG. 4 illustrates a flow diagram for an exemplary method of providing power utilization information in an integrated circuit, in accordance with various aspects of the present invention.

FIG. 4 illustrates a flow diagram for an exemplary method 400 of providing power utilization information in an integrated circuit, in accordance with various aspects of the present invention. For example and without limitation, the exemplary method 400 may share various aspects with the functionality discussed previously with regard to the exemplary integrated circuits 100, 200 and system 300 illustrated in FIGS. 1-3 and discussed previously.

The exemplary method 400 may begin at step 410. The exemplary method 400 (and other exemplary methods discussed herein) may begin for any of a variety of reasons. For example and without limitation, the exemplary method 400 may begin in response to a direct command to begin, either by a user or apparatus. Also for example, the method 400 may begin upon initiation of a production test sequence or utilization of the integrated circuit in a consumer product. Further for example, the method 400 may begin in response to real-time conditions that occur during utilization of the integrated circuit. Accordingly, the scope of various aspects of the present invention should not be limited by characteristics of any particular initiating causes or conditions.

The exemplary method 400 may, at step 420, comprise utilizing the integrated circuit in an electrical circuit. The electrical circuit may comprise any of a large variety of electrical circuit characteristics. For example and without limitation, the electrical circuit may comprise test circuitry (e.g., production and/or acceptance test circuitry). Also for example, the electrical circuit may comprise consumer product circuitry (e.g., electrical circuitry built for use by the general public or other groups of consumers).

In an exemplary production scenario where the electrical circuit comprises production test circuitry, the integrated circuit may be utilized in the electrical circuit in accordance with an operational test sequence. Such a test sequence might, for example, be utilized to test the integrated circuit, a portion of the integrated circuit, an electrical circuit comprising the integrated circuit, or any product comprising the integrated circuit.

In another exemplary scenario where the electrical circuit comprises consumer product circuitry, utilizing the integrated circuit may comprise utilizing the integrated circuit by utilizing the consumer product for its intended purpose. Such utilization may, for example, comprise use of the consumer product by an end consumer or by product production personnel.

In general, step 420 may comprise utilizing the integrated circuit in an electrical circuit. Accordingly, the scope of various aspects of the present invention should not be limited by characteristics of a particular utilization of the integrated circuit in a particular electrical circuit.

The exemplary method 400 may, at step 440, comprise determining power utilization information based, at least in part, on the utilization of the integrated circuit in the electrical circuit.

As mentioned previously, the power utilization information may comprise any of a variety of characteristics, which step 440 may comprise determining. For example and without limitation, step 440 may comprise determining information related to electrical power received by the integrated circuit and/or a portion thereof.

The power utilization information may comprise information related to various aspects of electrical power. For example and without limitation, step 440 may comprise determining information of voltage and/or current level. Also for example, step 440 may comprise determining information of voltage and/or current variability, such as, for example, tolerance range, ripple, or other fluctuation information.

Also for example, step 440 may comprise determining information of noise level and power supply load response characteristics. Step 440 may also comprise determining information regarding power and/or energy consumed by at least a portion of the integrated circuit and/or other circuitry.

Step 440 may, for example comprise determining information of preferable power supply characteristics for the integrated circuit and/or a portion thereof. Also for example, step 440 may comprise determining information of preferable power supply characteristics for electrical circuitry other than the integrated circuit. In a non-limiting exemplary scenario, a plurality of integrated circuits may perform individual tasks in support of an aggregate task. In such a non-limiting exemplary scenario, step 440 may comprise determining information of power supply characteristics for one or more of the plurality of integrated circuits.

Step 440 may, for example, comprise determining information of preferable (e.g., optimal or near-optimal) power supply characteristics for the integrated circuit or a portion thereof. Step 440 may also, for example, comprise determining information of power supply characteristics that are preferred for the operation of the integrated circuit. Step 440 may comprise determining that such power supply characteristics are preferred for any of a variety of reasons, including but not limited to, functional performance level, longevity, noise reduction, energy efficiency, etc. Accordingly, the scope of various aspects of the present invention should not be limited by any particular rationale for determining that one set of power supply characteristics is preferred over another.

In an exemplary scenario where performance of the integrated circuit is characterized by a plurality of performance characteristics, step 440 may comprise determining the power utilization information based, at least in part, on priority of the various performance characteristics. For example and without limitation, step 440 may comprise determining the power utilization information based only on the highest priority performance characteristic and corresponding power supply characteristics. Also for example, step 440 may comprise determining the power utilization information based on a weighted average of performance characteristic priorities and corresponding power supply characteristics.

Step 440 may, for example, comprise determining information of a recommended range of power supply characteristics provided to the integrated circuit and/or a portion thereof. In an exemplary scenario, step 440 may comprise determining information of a voltage range over which a manufacturer recommends that the integrated circuit be operated.

Step 440 may, for example, comprise determining information of estimated or actual preferred power supply characteristics for the integrated circuit or a portion thereof. For example and without limitation, step 440 may comprise determining power utilization information for an integrated circuit by directly testing the integrated circuit, testing a proxy integrated circuit representative of a manufacturing batch, performing computer simulation, performing theoretical analysis, testing an aggregate circuit of which the integrated circuit is a part, etc. Accordingly, the scope of various aspects of the present invention should not be limited by characteristics of a particular manner in which the power utilization information may be determined.

Step 440 may also, for example, comprise determining power utilization information that comprises information of circuit performance correlated to power supply characteristics. For example and without limitation, step 440 may comprise determining power utilization information that comprises one or more power supply characteristics correlated to optimal processing performance, one or more power supply characteristics correlated to optimal energy efficiency, one or more power supply characteristics correlated to a compromise between processing performance and energy-efficiency, etc.

Step 440 may, for example, comprise determining power utilization information based, at least in part, on power supply characteristics that are monitored during utilization of the integrated circuit, a portion thereof, or an aggregate circuit of which the integrated circuit is a part. Further for example, step 440 may comprise determining power utilization information based, at least in part, on performance characteristics that are monitored during use of the integrated circuit, a portion of the integrated circuit, or an aggregate circuit of which the integrated circuit is a part.

In an exemplary scenario, step 440 may comprise monitoring power supply characteristics and/or performance characteristics during utilization of the integrated circuit in a test environment (e.g., at an integrated circuit or other product manufacturing facility). In such an exemplary scenario, step 440 may comprise utilizing an integrated circuit test station at a manufacturing facility to test the integrated circuit at a variety of power supply characteristics to determine the power supply characteristics at which the integrated circuit operates best or at which the integrated circuit meets performance requirements.

In another exemplary scenario, step 440 may comprise performing such monitoring during commercial utilization of the integrated circuit (e.g., as the integrated circuit is utilized for its intended purpose in a consumer product). In such an exemplary scenario, step 440 may, for example, comprise utilizing the integrated circuit in a commercial product that comprises internal monitoring components that monitor power supply characteristics and/or performance of the integrated circuit during typical commercial use of the consumer product.

In general, step 440 may comprise monitoring power supply and/or performance characteristics for the integrated circuit in any of variety of manners. Accordingly, the scope of various aspects of the present invention should not be limited by a particular manner in which various power supply characteristics or performance metrics may be monitored during use of the integrated circuit.

The exemplary method 400 may, at step 450, comprise storing power utilization information (e.g., as determined at step 440) in the integrated circuit. Step 450 may, for example and without limitation, share various characteristics with the functionality discussed previously with regard to the power information modules and power information communication interface modules of the exemplary systems 100-300 illustrated in FIGS. 1-3 and discussed previously.

For example, step 450 may comprise writing the determined power utilization information in a memory circuit on-board the integrated circuit. Further for example, step 450 may comprise writing the determined power utilization information in a one-time writable memory circuit on-board the integrated circuit. Also for example, step 450 may comprise writing the determined power utilization information in re-writable memory on-board the integrated circuit. Accordingly, the scope of various aspects of the present invention should not be limited by characteristics of a particular manner of storing information in an integrated circuit.

Step 450 may, for example, comprise communicating determined power information with the integrated circuit over a data bus. Such a data bus may comprise any of a variety of data bus characteristics. Accordingly, the scope of various aspects of the present invention should not be limited by characteristics of a particular manner of communicating data.

The exemplary method 400 may, at step 460, comprise performing continued processing. Such continued processing may comprise any of a large variety of continued processing. For example and without limitation, step 460 may comprise looping back up to step 420 for continued power utilization analysis, determination and information storage. The scope of various aspects of the present invention should not be limited by characteristics of any particular continued processing.

Figure 5:
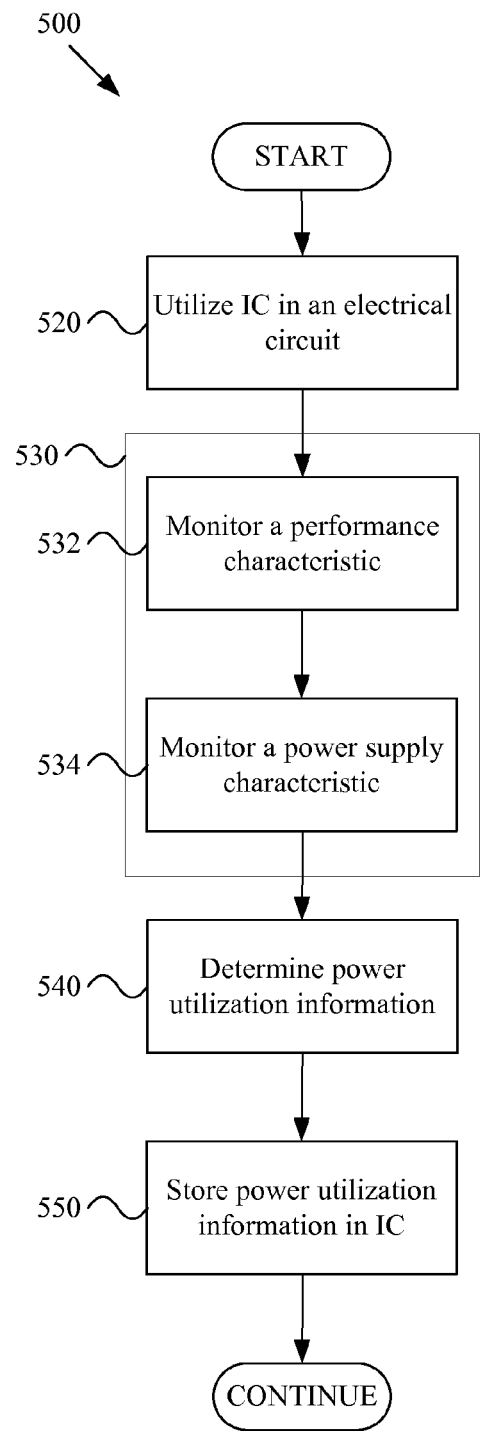
FIG. 5 illustrates a flow diagram for an exemplary method of providing power utilization information in an integrated circuit, in accordance with various aspects of the present invention.

FIG. 5 illustrates a flow diagram for an exemplary method 500 of providing power utilization information in an integrated circuit, in accordance with various aspects of the present invention. The exemplary method 500 may, for example and without limitation, share various aspects with the exemplary method 400 illustrated in FIG. 4 and discussed previously. Also for example and without limitation, the exemplary method 500 may share various aspects with the functionality discussed previously with regard to the exemplary integrated circuits 100, 200 and system 300 illustrated in FIGS. 1-3 and discussed previously.

The exemplary method 500 may, at step 520, comprise utilizing the integrated circuit in an electrical circuit. Step 520 may, for example and without limitation, share various characteristics with step 420 of the exemplary method 400 illustrated in FIG. 4 and discussed previously.

The exemplary method 500 may, at step 530, comprise monitoring various characteristics during utilization of the integrated circuit in the electrical circuit (e.g., as in step 520). Step 530 may, at sub-step 532, comprise monitoring at least one performance characteristic of the integrated circuit, a portion of the integrated circuit, an electrical circuit that comprises the integrated circuit, a consumer product that comprises the integrated circuit, etc.

As mentioned previously, such performance characteristics may comprise any of a variety of performance characteristics. For example and without limitation, such performance characteristics may comprise processing speed, data rate, response time, error rate, noise level, temperature, energy-efficiency, accuracy, resolution, etc. The scope of various aspects of the present invention should not be limited by particular performance characteristics.

Step 530 may, at step 534, comprise monitoring at least one power supply characteristic of electrical power supplied to the integrated circuit, a portion of the integrated circuit, an electrical circuit that comprises the integrated circuit, a consumer product that comprises the integrated circuit, etc.

As mentioned previously, such power supply characteristics may comprise any of a variety of power supply characteristics. For example and without limitation, such power supply characteristics may comprise voltage level, current level, voltage variability, noise level, load response characteristics, ripple level, etc. Accordingly, the scope of various aspects of the present invention should not be limited by particular power supply characteristics.

The exemplary method 500 may, at step 540 comprise determining power utilization information (e.g., based, at least in part, on the performance and/or power supply characteristics monitored at step 530). Step 540 may, for example and without limitation, share various characteristics with step 440 of the exemplary method 400 illustrated in FIG. 4 and discussed previously.

For example, step 540 may comprise determining a power supply characteristic at which the integrated circuit performs optimally. Also for example, step 540 may comprise determining one or more recommended power supply characteristics of electrical power provided to the integrated circuit. Further for example, step 540 may comprise determining a recommended range of power supply characteristics of electrical power provided to the integrated circuit. Still further for example, step 540 may comprise determining correlated power supply characteristic and performance characteristic information. Step 540 may, for example, comprise identifying at least one power supply characteristic that corresponds to preferable performance (e.g., optimal performance or performing to specifications) of the integrated circuit.

In an exemplary scenario involving a plurality of performance characteristics to consider, step 540 may, for example, comprise determining power utilization information based, at least in part, on performance characteristic priority. In making such a determination, step 540 may, for example, base the power utilization information solely on a highest priority performance characteristic. Alternatively for example, step 540 may base the power utilization information on a weighted averaging of weighted performance characteristics and corresponding power supply characteristics.

In general, step 540 may comprise determining power utilization information (e.g., based, at least in part, on the performance and/or power supply characteristics monitored at step 530). Accordingly, the scope of various aspects of the present invention should not be limited by characteristics of particular power utilization information or a manner of determining such information.

The exemplary method 500 may, at step 550, comprise storing the determined power utilization information (e.g., as determined at step 540) in the integrated circuit. Step 550 may, for example and without limitation, share various characteristics with step 450 of the exemplary method 400 illustrated in FIG. 4 and discussed previously.

Figure 6:
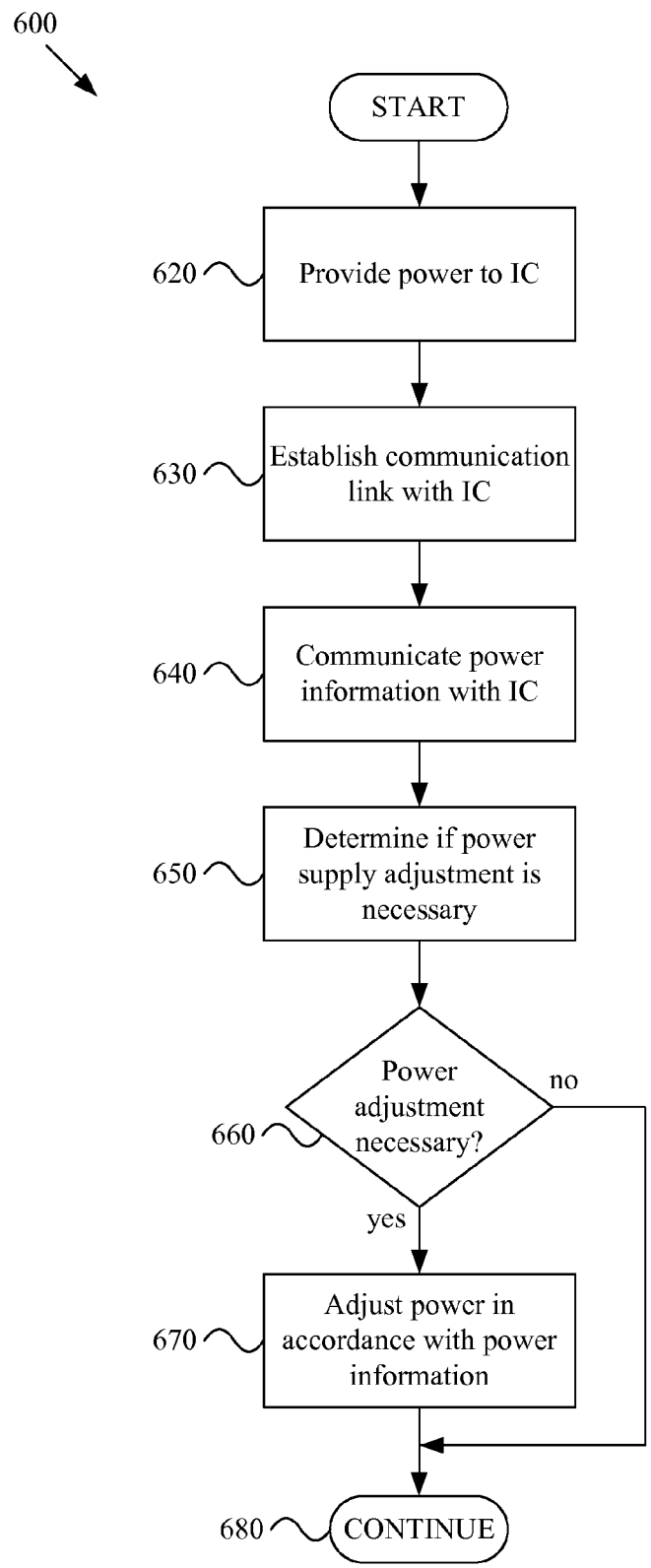
FIG. 6 illustrates a flow diagram of an exemplary method of utilizing an integrated circuit that comprises on-board power utilization information, in accordance with various aspects of the present invention.

FIG. 6 illustrates a flow diagram of an exemplary method 600 of utilizing an integrated circuit that comprises on-board power utilization information, in accordance with various aspects of the present invention.

The exemplary method 600 may, at step 620, comprise providing electrical power to the integrated circuit (e.g., initial power). Step 620 may, for example and without limitation, comprise providing electrical power to the integrated circuit in any of a variety of manners and utilizing any of a variety of power supply circuitry (e.g., a controllable power supply circuit).

The exemplary method 600 may, at step 630, comprise establishing a communication link with the integrated circuit over which power utilization information may be communicated. Such a communication link may comprise any of a variety of communication link characteristics. For example and without limitation, step 630 may comprise establishing a communication link with the integrated circuit over a general-purpose data bus or over a data bus dedicated to communicating power utilization information. Step 630 may, for example, comprise establishing a communication link over a power supply line. Step 630 may, for example, comprise establishing the communication link over any of a variety of media and utilizing any of a variety of communication protocols.

In general, step 630 may comprise establishing a communication link with the integrated circuit over which power utilization information may be communicated. Accordingly, the scope of various aspects of the present invention should not be limited by characteristics of a particular communication link.

The exemplary method 600 may, at step 640, comprise communicating power utilization information with the integrated circuit (e.g., over the communication link established at step 630), where at least a portion of the power utilization information is stored in the integrated circuit. Step 640 may comprise any of a variety of entities communicating the power utilization information with the integrated circuit. For example and without limitation, power supply circuitry (e.g., similar to the power supply circuit 320 illustrated in FIG. 3 and discussed previously) may communicate power utilization information with the integrated circuit. Such communication may, for example, comprise one-way or two-way communication of the power utilization information.

The exemplary method 600 may, at step 650, comprise determining whether an adjustment to characteristics of electrical power presently being provided to the integrated circuit is necessary. Step 650 may comprise making such a determination in any of a variety of manners. For example and without limitation, step 650 may comprise analyzing power utilization information (e.g., as communicated at step 640) to determine whether characteristics of electrical power that is presently being provided to the integrated circuit are appropriate.

In an exemplary non-limiting scenario, the power utilization information may comprise information of a preferred operating voltage level for the integrated circuit that is significantly different than the present voltage level. In such an exemplary scenario, step 650 may comprise determining that one or more of the power characteristics (e.g., the voltage level) of the electrical power presently being provided to the integrated circuit should be modified.

In general, step 650 may comprise determining whether an adjustment to characteristics of electrical power presently being provided to the integrated circuit is necessary. Accordingly, the scope of various aspects of the present invention should not be limited by characteristics of a particular manner of making such a determination.

The exemplary method 600 may, at step 660, comprise controlling the execution flow of the method 600. If, for example, step 650 determines that an adjustment to characteristics of electrical power presently being provided to the integrated circuit is not necessary, then step 660 may direct the execution flow of the method 600 to step 680 for continued processing. If, however, step 650 determines that an adjustment to characteristics of electrical power presently being provided to the integrated circuit is necessary, then step 660 may direct the execution flow of the method 600 to step 670 for a power adjustment.

The exemplary method 600 may, at step 670, comprise providing electrical power to the integrated circuit, where at least one characteristic of the electrical power is based, at least in part, on the power utilization information (e.g., as communicated at step 640). For example and without limitation, step 670 may comprise adjusting at least one of the present characteristics of electrical power presently provided to the integrated circuit.

Step 670 may comprise adjusting characteristics of electrical power, based at least in part on the power utilization information, in any of a variety of manners. For example and without limitation, step 670 may comprise exactly matching the characteristics of electrical power provided to the integrated circuit to characteristics specified in the power utilization information. Continuing the previous exemplary scenario where the power utilization information comprises information of a preferred voltage level, step 670 may comprise adjusting the electrical power provided to the integrated circuit so that the electrical power is characterized by the preferred voltage level.

Alternatively for example, step 670 may comprise utilizing the power utilization information as a guide from which to determine characteristics of electrical power provided to the integrated circuit. Such electrical power may, for example, be provided to a plurality of integrated circuits, each with respective power supply needs.

In an exemplary scenario where a power supply is providing electrical power to a plurality of integrated circuits, step 670 may comprise arbitrating between respective power supply needs of the plurality of integrated circuits. Such arbitration may, for example, be based on respective priorities of the integrated circuits. For example, step 670 may comprise providing electrical power having characteristics specified by a highest priority integrated circuit. Also for example, step 670 may comprise providing electrical power having characteristics determined by a weighted calculation of integrated circuit priorities and power supply needs.

In general, step 670 may comprise adjusting characteristics of electrical power, based at least in part on the power utilization information. Accordingly, the scope of various aspects of the present invention should not be limited by characteristics of a particular power supply adjustment or manner of determining or making a power supply adjustment.

It should be noted that the various exemplary methods and systems illustrated in FIGS. 1-6 and discussed previously may apply to modules within an integrated circuit, an integrated circuit, or a group of integrated circuits. Accordingly, the scope of various aspects of the present invention should not be limited by characteristics of arbitrary circuit boundaries and divisions. In general, the methods and systems illustrated in FIGS. 1-6 are merely exemplary, and accordingly, the scope of various aspects of the present invention should not be limited by characteristics of the exemplary illustrations.

It should be stressed that various aspects of the present invention may be performed by hardware, a processor executing software instructions, or a combination thereof. Further, it should be noted that various aspects of the present invention may be implemented by hardware and/or software with varying degrees of integration and/or distribution. Accordingly, the scope of various aspects of the present invention should not be limited by characteristics of any particular implementation.

In summary, various aspects of the present invention provide a system and method for storing power utilization information in an integrated circuit and utilizing such information. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. An integrated circuit comprising:
a first module that operates to store power utilization information for electrical circuitry utilized by a first functional module of the integrated circuit and for electrical circuitry utilized by a second functional module of the integrated circuit, wherein the power utilization information comprises a noise level related to an electrical power signal received by the integrated circuit, wherein the power utilization information further comprises information of at least one preferable power supply characteristic for electrical power provided to the integrated circuit, and wherein the information of at least one preferable power supply characteristic comprises information of at least one power supply characteristic that reduces the noise level related to an electrical power signal received by the integrated circuit; and
a second module, communicatively coupled to the first module, that operates to perform communication comprising receiving the power utilization information from an electrical device external to the integrated circuit.

2. The integrated circuit of claim 1, wherein: the first module comprises a power information module; and the second module comprises a power information communication interface module.

3. The integrated circuit of claim 1, wherein the information of at least one preferable power supply characteristic comprises: first voltage information comprising voltage level information; and second voltage information different from voltage level information.

4. The integrated circuit of claim 1, wherein the information of at least one preferable power supply characteristic comprises voltage variability information.

5. The integrated circuit of claim 1, wherein the information of at least one preferable power supply characteristic comprises voltage range information.

6. The integrated circuit of claim 1, wherein the information of at least one preferable power supply characteristic comprises information indicative of a recommended voltage range for electrical power provided to the integrated circuit.

7. The integrated circuit of claim 1, wherein the information of at least one preferable power supply characteristic comprises information identifying an input voltage of electrical power provided to the integrated circuit that correlates to optimal energy efficiency of the integrated circuit.

8. The integrated circuit of claim 1, wherein the information of at least one preferable power supply characteristic comprises information identifying an input voltage of electrical power provided to the integrated circuit that correlates to optimal processing performance of the integrated circuit.

9. The integrated circuit of claim 1, wherein the information of at least one preferable power supply characteristic is based, at least in part, on a power supply characteristic of electrical power provided to the integrated circuit and monitored during use of the integrated circuit.

10. The integrated circuit of claim 9, wherein the use of the integrated circuit comprises use of the integrated circuit by an end user in a consumer product.

11. The integrated circuit of claim 9, wherein the information of at least one preferable power supply characteristic is further based, at least in part, on a performance characteristic monitored during use of the integrated circuit and a correlation between the monitored power supply characteristic and the monitored performance characteristic.

12. The integrated circuit of claim 11, wherein the monitored performance characteristic comprises error rate.

13. The integrated circuit of claim 9, wherein the information of at least one preferable power supply characteristic is further based, at least in part, on a plurality of different performance characteristics monitored during use of the integrated circuit and a correlation between the monitored power supply characteristic and the monitored performance characteristics.

14. The integrated circuit of claim 13, wherein the information of at least one preferable power supply characteristic is further based, at least in part, on respective priority levels associated with the respective monitored performance characteristics.

15. The integrated circuit of claim 14, wherein the information of at least one preferable power supply characteristic corresponds to one of the respective monitored performance characteristics with the highest respective priority level.

16. The integrated circuit of claim 14, wherein the information of at least one preferable power supply characteristic is based, at least in part, on a compromise between processing performance of the integrated circuit and energy efficiency of the integrated circuit.

17. An electrical system comprising:
an integrated circuit that comprises:
a first module that operates to store power utilization information for electrical circuitry utilized by a first functional module of the integrated circuit and for electrical circuitry utilized by a second functional module of the integrated circuit, wherein the power utilization information comprises noise level related to an electrical power signal received by the integrated circuit and information of at least one preferable power supply characteristic for electrical power provided to the integrated circuit; and
a second module, communicatively coupled to the first module, that operates to receive the power utilization information from an electrical device external to the integrated circuit; and
a power supply circuit that comprises:
an interface module, communicatively coupled to the second module of the integrated circuit, that operates to perform communication comprising receiving the power utilization information from the second module of the integrated circuit; and
a power output module that operates to provide electrical power to the integrated circuit, wherein a characteristic of the electrical power is based, at least in part, on the power utilization information received from the second module of the integrated circuit.

18. The system of claim 17, wherein the information of at least one preferable power supply characteristic is based, at least in part, on:
a power supply characteristic of electrical power provided to the integrated circuit and monitored during use of the integrated circuit;
a performance characteristic monitored during use of the integrated circuit; and
a correlation between the monitored power supply characteristic and the monitored performance characteristic.

19. The system of claim 18, wherein the power supply characteristic of electrical power provided to the integrated circuit and monitored during use of the integrated circuit comprises noise level related to an electrical power signal received by the integrated circuit.

20. The system of claim 18, wherein the performance characteristic monitored during use of the integrated circuit comprises noise level related to an electrical power signal received by the integrated circuit.

* * * * *